March 15, 1927.
W. H. DE CAMP
1,621,355
PIE PLATE SCOOP
Filed Feb. 26, 1925
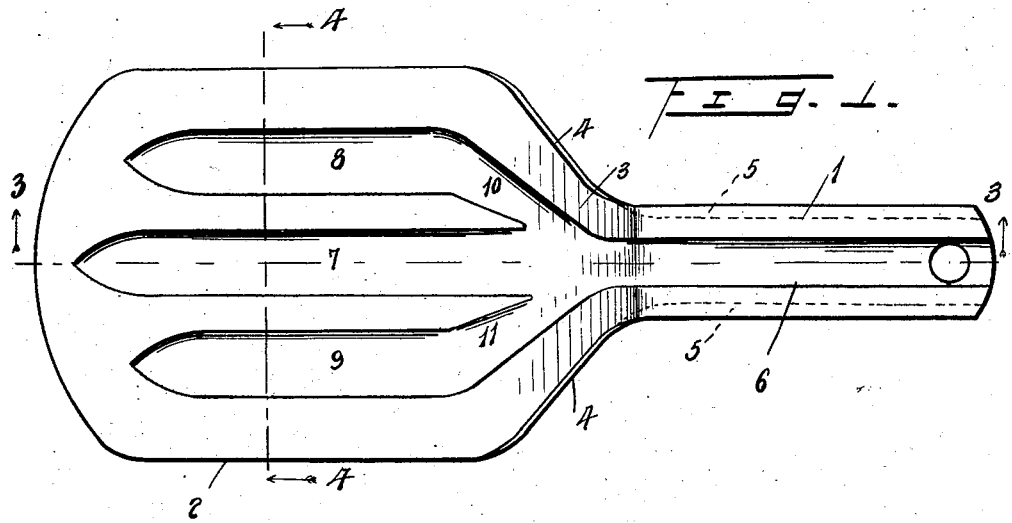
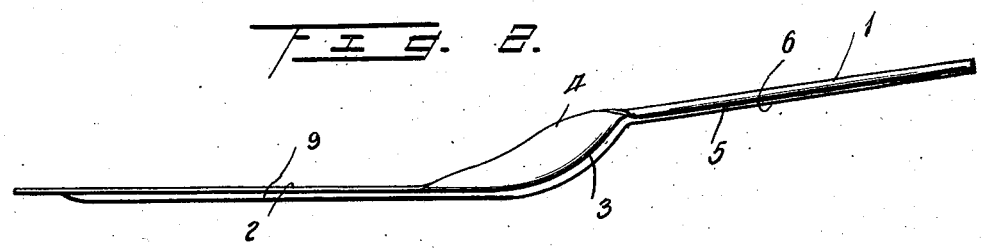
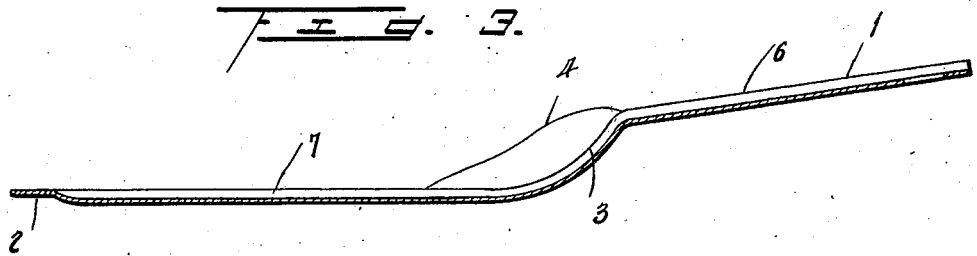
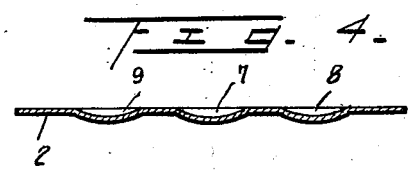
Inventor
W. H. De Camp,
By
Attorney Patented Mar. 15, 1927.

1,621,355

UNITED STATES PATENT OFFICE.

WILLIAM H. DE CAMP, OF VAN WERT, OHIO.

PIE-PLATE SCOOP.

Application filed February 26, 1925. Serial No. 11,859.

The invention relates to means for removing hot pie plates, cake pans and the like from ovens, and has for its object the provision of a scoop made of a single piece of sheet metal having a handle and scoop portions strengthened by longitudinal and diversional ribs, and flanges on the sides of the scoop portion adjacent the handle to prevent sidewise movement of the pie plate or cake pan in removing it from the oven.

The device will be described in detail hereinafter and illustrated in the accompanying drawings in which—

Figure 1 is a top plan view of the improved pie plate scoop,

Figure 2 a side view,

Figure 3 a longitudinal sectional view on the line 3—3 of Figure 1, and

Figure 4 a cross section on the line 4—4 of Figure 1.

In the drawings similar reference characters will be used to designate corresponding parts in the several views.

The pie plate scoop is made of a single piece of sheet metal of suitable gauge having a handle portion 1 and a flat scoop portion 2, the scoop adjacent to the handle being upwardly curved as shown at 3, the plane of the handle portion being upwardly divergent from the plane of the scoop as clearly shown in Figures 2 and 3.

The edges of the scoop 2 adjacent the handle are bent upwardly to form flanges 4, and the edges of the handle are rolled under the handle to form a strengthening piece 5.

A rib 6 is formed in the handle and ribs 7, 8, and 9 are formed in the scoop, said ribs being substantially parallel and having their ends adjacent the outer edge of the scoop converging as shown in Figure 1 of the drawings. Rib 7 is a continuation of rib 6 while ribs 8 and 9 have inwardly inclined portions 10 and 11, respectively, that merge into ribs 6 and 7. The purpose of the ribs 6, 7, 8, and 9 and the connecting ribs 10 and 11 is to strengthen the implement and the engagement of the handle 1 and scoop 2.

In using the implement to remove a pie plate from the oven, the edge of the scoop is inserted under the pie plate and the implement is then rocked on the rounded portion 3 to elevate the plate from the floor of the oven. The pie plate will slide on the scoop 2 and come to rest against the flanges 4 and will be held by said flanges from sidewise movement on the scoop while being removed from the oven.

What is claimed is:—

A pie plate scoop made of a single blank of metal comprising a handle and a relatively wide flat scoop, said scoop being rounded at the rear end whereby the handle is elevated, said scoop being adapted for rocking on said end after engagement with a pie plate, a plate retaining flange on each edge of the scoop adjacent the handle, the side edges of the handle being bent thereunder to reinforce and strengthen the same, a depressed rib extending continuously from the end of the handle to approximately the relatively opposite end of the scoop, and said scoop having depressed ribs merging into the first mentioned rib along diverging lines at the rounded rear end of the scoop.

In testimony whereof I affix my signature.

WILLIAM H. DE CAMP.